United States Patent
Reich

(10) Patent No.: US 9,043,049 B2
(45) Date of Patent: May 26, 2015

(54) METHOD FOR PROVIDING USER-SPECIFIC SETTINGS IN A MOTOR VEHICLE AND METHOD FOR DETERMINING AN ASSIGNMENT OF A MOBILE COMMUNICATIONS DEVICE TO A MOTOR VEHICLE FROM A PLURALITY OF MOTOR VEHICLES

(75) Inventor: Andreas Reich, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/131,313

(22) PCT Filed: Jul. 5, 2012

(86) PCT No.: PCT/EP2012/002818
§ 371 (c)(1),
(2), (4) Date: Jan. 7, 2014

(87) PCT Pub. No.: WO2013/004379
PCT Pub. Date: Jan. 10, 2013

(65) Prior Publication Data
US 2014/0163778 A1    Jun. 12, 2014

(30) Foreign Application Priority Data
Jul. 7, 2011    (DE) .......................... 10 2011 106 887

(51) Int. Cl.
*B60R 16/037* (2006.01)
*G07C 9/00* (2006.01)

(52) U.S. Cl.
CPC .......... *B60R 16/037* (2013.01); *G07C 2209/63* (2013.01); *G07C 9/00166* (2013.01)

(58) Field of Classification Search
CPC ..................................................... B60R 16/037
See application file for complete search history.

(56) References Cited

U.S. PATENT DOCUMENTS

| | | | |
|---|---|---|---|
| 6,650,999 B1 | 11/2003 | Brust et al. | |
| 7,085,632 B2 * | 8/2006 | Nakaya ........................... | 701/49 |
| 7,283,902 B2 * | 10/2007 | Heider et al. ................... | 701/49 |
| 8,242,884 B2 * | 8/2012 | Holcomb et al. ............... | 340/5.7 |
| 8,421,589 B2 * | 4/2013 | Sultan et al. ................. | 340/5.27 |

(Continued)

FOREIGN PATENT DOCUMENTS

| | | |
|---|---|---|
| DE | 29909002 | 9/1999 |
| DE | 10212778 | 10/2003 |

(Continued)

OTHER PUBLICATIONS

German Office Action for Corresponding German Patent Application No. 10 2011 122 893.8, issued Mar. 19, 2014, 7 pages.

(Continued)

*Primary Examiner* — John R Olszewski
*Assistant Examiner* — Todd Melton
(74) *Attorney, Agent, or Firm* — Staas & Halsey LLP

(57) ABSTRACT

Data and consequently settings in a motor vehicle are personalized in the present case using a central data processing device. The latter knows the positions of a motor vehicle or a plurality of motor vehicles and transmits these positions to a mobile communication appliance, which compares the transmitted positions with its own. If the result of the comparison is that the mobile communication appliance is situated in proximity to one of the motor vehicles, personalized data are transmitted, which can then be used to make personalized settings.

10 Claims, 2 Drawing Sheets

(56) References Cited

U.S. PATENT DOCUMENTS

| | | | | |
|---|---|---|---|---|
| 8,719,155 | B2* | 5/2014 | Maney | 705/39 |
| 2004/0010358 | A1* | 1/2004 | Oesterling et al. | 701/49 |
| 2008/0082226 | A1* | 4/2008 | Amador et al. | 701/29 |
| 2008/0200209 | A1 | 8/2008 | Cahoon | |
| 2010/0036560 | A1* | 2/2010 | Wright et al. | 701/36 |
| 2010/0073201 | A1 | 3/2010 | Holcomb et al. | |
| 2011/0214060 | A1* | 9/2011 | Imes et al. | 715/735 |
| 2013/0211623 | A1* | 8/2013 | Thompson et al. | 701/2 |
| 2014/0099899 | A1* | 4/2014 | Jamal-Syed et al. | 455/41.2 |

FOREIGN PATENT DOCUMENTS

| | | |
|---|---|---|
| DE | 102004028569 | 6/2005 |
| DE | 60037898 | 1/2009 |
| DE | 102008037018 | 2/2010 |
| DE | 2228270 | 9/2010 |
| DE | 102009037086 | 2/2011 |
| DE | 102011106887.6 | 7/2011 |
| WO | PCT/EP2012/002818 | 7/2012 |

OTHER PUBLICATIONS

"DriveNow ab Apr. 2011," N24 Gesellschaft für Nachrichten und Zeitgeschehen mbH, Berling, Mar. 21, 2011, http://www.n24.de/n24/Nachrichten/Auto-Verkehr/d/1237752/drivenow-ab-april-2011.html.

Carsharing 2.0: Brainstorming results from Stanford Seminar class "The Future of the Automobile," Sven Beiker, Lecturer, Stanford University, http://www.stanford.edu/class/me302/PreviousTerms/2010-10-05%20Carsharing.pdf, Oct. 5, 2010, 2 pages.

"Drive Now moving with the latest technology," Published on Jun. 9, 2011 by DriveNow, http://blog.drive-now.de/2011/06/09/drivenow-bewegt-%E2%80%93-dank-modernster-fahrzeug-ortungs-und-identifikationstechnik/#more-45, 15 pages.

Frank Kabodt, "Audi Mobile Device: Concept Phone from Ingolstadt," Oct. 29, 2007, 6 pages.

English Language International Search Report for PCT/EP2012/002818, 3 pages, mailing date May 10, 2012.

English Language Translation of Written Opinion for PCT/EP2012/002818, downloaded from WIPO website Jan. 7, 2014, 11 pages.

* cited by examiner

METHOD FOR PROVIDING USER-SPECIFIC SETTINGS IN A MOTOR VEHICLE AND METHOD FOR DETERMINING AN ASSIGNMENT OF A MOBILE COMMUNICATIONS DEVICE TO A MOTOR VEHICLE FROM A PLURALITY OF MOTOR VEHICLES

CROSS REFERENCE TO RELATED APPLICATIONS

This application is based on and hereby claims priority to International Application No. PCT/EP2012/002818 filed on Jul. 5, 2012 and German Application No. 10 2011 106 887.6 filed on Jul. 7, 2011, the contents of which are hereby incorporated by reference.

BACKGROUND

One aspect of the invention relates to a method for providing user-specific settings in a motor vehicle.

DE 600 37 898 T2 discloses that a motor vehicle key enters into communication with a communication device in the motor vehicle, specifically via a Bluetooth link. In this case, it is the user who needs to ensure that the key is in sufficient proximity to the motor vehicle. If this is the case, personal settings that are specific for the user of the key can be loaded.

DE 10 2009 037 086 A1 describes a vehicle key that can be used to store personal data. The position of the motor vehicle is stored even when said motor vehicle is left. This allows the motor vehicle to be found using the stored position data.

Personal data or user-specific settings may be menu settings in an operator unit that are provided in a motor vehicle. They may also relate to mechanical settings, for example those for a seat, a steering wheel, a mirror or the like.

The approaches in the related art for how to activate personal data are always based on one and the same user using one and the same motor vehicle, provision not even being made for the driver to change.

However, it is a greater challenge for user-specific settings to be provided even when the motor vehicle is used by different users or when even a plurality (a fleet) of motor vehicles is used by a plurality of users in alternation.

SUMMARY

It is therefore one potential object to allow user-specific settings to be provided in a motor vehicle under such conditions too.

The inventor proposes a method for providing user-specific settings in a motor vehicle therefore involves a) specific data for a user being stored in a central data processing device, wherein the user has an associated mobile communication appliance, and b) the motor vehicle ascertaining its position and transmitting it wirelessly to the central data processing device when it is parked, that is to say particularly when it is brought to a standstill and either the driver's seat is left or the vehicle is locked or both.

In the subsequent step c), the position of the parked motor vehicle is transmitted from the central data processing device to the mobile communication appliance. In step d), the mobile communication appliance then repeatedly ascertains its own position and respectively compares it with the position of the parked motor vehicle. If the mobile communication appliance is situated in proximity to the parked motor vehicle on the basis of a predetermined criterion, this information concerning the proximity is transmitted to the central data processing device. In addition, e) the central data processing device, upon receiving the information, transmits the specific data for the user associated with the mobile communication appliance to the motor vehicle (parked in proximity to the mobile communication appliance). Finally, in step f) the motor vehicle uses the transmitted specific data to make the user-specific settings.

In the present case, the proposed method uses a central data processing device for a personalization. When said data processing device manages the data, namely the specific data for the user, on the one hand, and the position of the parked motor vehicle, on the other, it is irrelevant whether the parked motor vehicle is moved by another user, since after it has been parked again the position is transmitted to the central data processing device once more and is also available to that mobile communication appliance whose user did not last use the parked motor vehicle. Furthermore, the use of a central data processing device allows settings to be made even outside the motor vehicle and without using the mobile communication appliance, namely on a personal computer, for example; the settings are then transmitted to the central data processing device and later from the latter to the motor vehicle.

In one preferred embodiment, the motor vehicle is part of a group of motor vehicles (plurality of motor vehicles or fleet). The positions of all of the motor vehicles in the group are ascertained when they are parked, and the positions are transmitted to the mobile communication appliance via the circuitous route of the central data processing device and are respectively compared with the position of the mobile communication appliance. The specific data for the user are transmitted to a respective motor vehicle parked in proximity to the mobile communication appliance.

In this aspect, it becomes clear that the proposed method, in being applied to a plurality of motor vehicles, allows the use of the user-specific settings in a multiplicity of motor vehicles in succession or in alternation. This is once again made possible in this case firstly on account of the use of the central data processing device and secondly by virtue of the mobile communication appliance automatically recognizing which of the motor vehicles from the group is respectively situated in proximity and will therefore probably be driven by the user of the mobile communication appliance within a short time.

In one preferred embodiment, the predetermined criterion according to which a check is performed to determine whether the mobile communication appliance is situated in proximity to the parked motor vehicle involves a check for the existence of a maximum distance between the mobile communication appliance and the motor vehicle. The maximum distance may be defined either as the crow flies or as a route section on predetermined routes that are available in a navigation functionality of the mobile communication appliance, for example. This preferred aspect preferably involves ascertainment of how often the event occurs that the data are transmitted in step e) without the motor vehicle being started. When an absolute or time-interval-based (particularly time-unit-based) minimum frequency of this event is reached, the maximum distance is then increased. This measure prevents a user who is in proximity to a motor vehicle without wishing to drive it—for example when it is parked in front of a house in which he lives—from prompting constant transmission of the user-specific data and possibly respective renewed making of the settings, perhaps even in alternation with another user.

The settings preferably relate to menu settings for an operator unit in the motor vehicle and/or the presentation of particular data such as a road map previously stored in a central data processing device and/or mechanical settings for a seat, steering wheel, mirror or the like. The proposed method allows the number of settings to be increased because the associated personal, user-specific data do not need to be stored in the mobile communication appliance, of course, but rather are available in the central data processing device.

The inventor also proposes a method that contains, to a certain extent, steps c) and d) described above, in application to a vehicle fleet: an association between a mobile communication appliance and a motor vehicle from a plurality of motor vehicles is ascertained, where a central data processing device knows the positions of the vehicles and transmits them to a mobile communication appliance that uses its own position and the positions of the vehicles to derive an association with one of the vehicles on the basis of a predetermined criterion. The association identifies that the user of the mobile communication appliance will probably use the motor vehicle within a short time.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
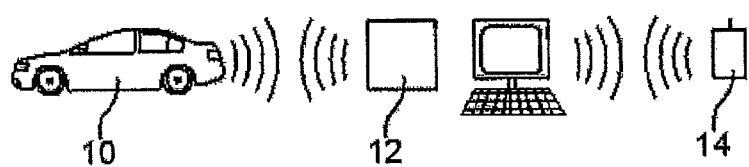
FIG. 1 shows a motor vehicle, a central data processing device, a mobile communication appliance and associated devices.
Figure 2:
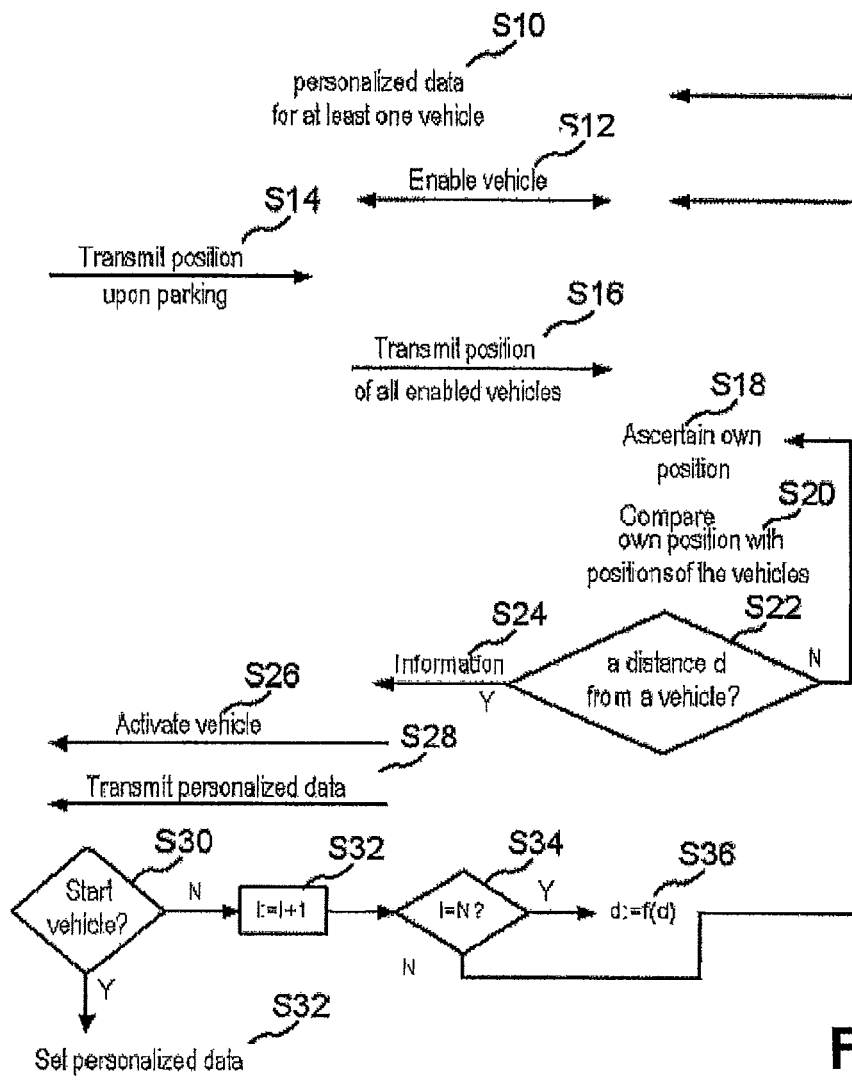
FIG. 2 is a flowchart to explain the flow of data between the motor vehicle, central data processing device and mobile communication appliance.

Reference will now be made in detail to the preferred embodiments of the present invention, examples of which are illustrated in the accompanying drawings, wherein like reference numerals refer to like elements throughout.

In the present case, a motor vehicle 10 is intended to be able to communicate bidirectionally with a central data processing device 12, with which a mobile communication appliance 14 can also communicate bidirectionally. In this case, the motor vehicle 10 is a motor vehicle from a plurality of motor vehicles in a motor vehicle fleet. Similarly, there are a plurality of users of the motor vehicles, each of whom have their own associated mobile communication appliance 14.

In the present case, a user is supposed to have made particular settings, for example in a menu for a motor vehicle, or else to have adjusted his seat, his steering wheel, his side mirrors and the rearview mirrors or the like as appropriate, so that the vehicle has optimum settings for him personally. The user now wishes to use these data in a plurality of motor vehicles of similar type. Personalized data can even be used in motor vehicles of different type; by way of example, the seat settings from an Audi A6 can also be transferred to an Audi A8, even though there may be more setting options available; conversely, the seat settings from an Audi A8 can also be used, in simplified form, for the Audi A6 when there are fewer setting options available therein.

So that these personalized data can be used to make personal settings, they are first of all stored in the central data processing device 12 for at least one vehicle in step S10, for example are installed from a personal computer via a data link or else are loaded by communication between a motor vehicle 10 and the central data processing device 12.

The central data processing device 12 now needs to have the information that a user of a mobile communication appliance 14 is authorized to use a particular vehicle. This is called "enabling", and in the present case such enabling of a vehicle takes place in step S12.

It can now be assumed that the motor vehicle 10 has been driven. When the motor vehicle 10 is parked, that is to say when a seat occupancy sensor recognizes that the motor vehicle is left and/or the motor vehicle 10 is locked from the outside, for example, the motor vehicle 10 transmits its position to the central data processing device 12 in step S14. The position is known to the motor vehicle 10 if the latter has an appropriate position finding sensor that uses the global positioning system, GPS, for example.

In the present case, this occurs for a plurality of such vehicles 10. In step S16, the central data processing device 12 now transmits the position of all of the vehicles enabled for the mobile communication appliance 14 that are parked simultaneously to the mobile communication appliance. In step S18, the latter then ascertains its own position, for example likewise using the GPS. In step S20, the mobile communication appliance 14 compares its own position with the positions of the vehicles that have been transmitted in step S16. In step S22, as the result of the comparison, a check is then performed to determine whether the mobile communication appliance 14 is at a distance from the vehicle that is within a radius of the distance d from the vehicle. So long as this is not the case, steps S18 and S20 are repeated, and possibly even steps S10 and S12 are repeated. However, as soon as the mobile communication appliance 14 is within a radius of the motor vehicle 10 that is chosen such that it can be assumed that the user of the mobile communication appliance 14 has deliberately moved in proximity to the motor vehicle 10, a piece of information in this regard is transmitted to the central data processing device 12 in step S24. The latter then activates the motor vehicle 10 is step S26. (What is known as "waking" is performed.) After that, the personalized data that have been stored on the central data processing device 12 in step S10 are transmitted to the motor vehicle 10 in step S28. In step S30, a check is then performed to determine whether the motor vehicle 10 is actually started, that is to say whether the assumption that the user of the mobile communication appliance 14 proceeded to the proximity of the motor vehicle 10 for the purpose of moving it was correct. If this is the case, the personalized data are used in step S32 to make appropriate settings, namely to present data, to display menu settings or else to make mechanical settings. If the motor vehicle 10 is not started even though the mobile communication appliance 14 was in proximity to the motor vehicle 10, a counter is increased by one in step S32. (The counter can be set to zero at the same time as step S10 is carried out, for example.) When the counter then reaches a threshold N, which is checked for in step S34, the distance d is redefined in step S36, for example if the previous distance value d is decreased by a particular value in meters, then it would be the case that f(d)=d−c. Similarly, it is also possible to make the change of distance proportionately dependent on the distance d or to provide it with another dependency, for example according to:

$$d:=d\cdot(1-\delta).$$

So long as the threshold value has not yet been reached in step S34 or after a new distance has been stipulated, the process returns to step S18, or there is immediately a return to steps S10 and S12.

The measure of restipulating the maximum distance from one of the vehicles has the background that certain users could, for structural reasons, for example in the case of their residence, move in the proximity of the motor vehicle 10 relatively frequently without wishing to use said motor vehicle. At some time or another, the distance d is chosen to be short enough for the vehicle not to be activated superfluously each time in step S26 and personalized data to be transmitted in step S28.

To some extent, the method is therefore a learning method. This learning function is not imperative for the method, however, but rather a constant distance d may also be provided.

The test criterion provided in step S22 may relate to a distance as the crow flies or to a route section distance (path length) on pedestrian routes on which the user of the mobile communication appliance 14 moves.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for providing user-specific settings in a motor vehicle, comprising:
    storing user-specific data in a central data processing device, the user-specific data being associated with a user that has an associated mobile communication appliance;
    ascertaining a position of the motor vehicle when the motor vehicle is parked;
    wirelessly transmitting the position from the motor vehicle to the central data processing device;
    transmitting the position of the motor vehicle from the central data processing device to the mobile communication appliance;
    repeatedly ascertaining a position of the mobile communication appliance and comparing the position of the mobile communication appliance with the position of the motor vehicle;
    increasing a counter value if the position of the mobile communication appliance is ascertained to be within a predetermined proximity to the position of the motor vehicle and the motor vehicle is not started within a predetermined amount of time;
    transmitting position information regarding a match to the central data processing device if, based on a predetermined criterion, the mobile communication appliance is situated in proximity to the motor vehicle when the motor vehicle is parked;
    updating the predetermined criterion if the counter value reaches a predetermined threshold;
    upon receiving the position information, transmitting the user-specific data to the motor vehicle; and
    using the user-specific data at the motor vehicle to provide the user-specific settings.

2. The method as claimed in claim 1, wherein
    the motor vehicle is part of a group of motor vehicles,
    positions of all motor vehicles in the group are ascertained when the motor vehicles are parked, the positions being transmitted to the mobile communication appliance via the central data processing device,
    the positions of all of the motor vehicles are compared with the position of the mobile communication appliance,
    it is determined that a proximate motor vehicle is located in proximity to the mobile communication appliance, and
    the user-specific data are transmitted to the proximate motor vehicle.

3. The method as claimed in claim 2, wherein
    the group of motor vehicles comprises vehicles of different model or make, and
    the user-specific data is adapted to a model or make of the proximate motor vehicle.

4. The method as claimed in claim 1, wherein
    the predetermined criterion specifies a maximum distance of the mobile communication appliance from the motor vehicle,
    the maximum distance relates to as a crow flies or route sections between the mobile communication appliance and the motor vehicle, and
    if the user-specific data is transmitted to the motor vehicle without the motor vehicle being started, the maximum distance is decreased.

5. The method as claimed in claim 4, wherein
    a false start occurs if the user-specific data is transmitted to the motor vehicle without the motor vehicle being started, and
    the maximum distance is decreased when a frequency of false starts reaches a maximum frequency.

6. The method as claimed in claim 4, wherein
    a false start occurs if the user-specific data is transmitted to the motor vehicle without the motor vehicle being started, and
    the maximum distance is decreased when a maximum number of false starts has been reached.

7. The method as claimed in claim 1, wherein
    the settings relate to data and/or menu settings presented to the user for operating devices in the motor vehicle.

8. The method as claimed in claim 1, wherein
    the settings relate to mechanical settings for a seat, a steering wheel or a mirror of the motor vehicle.

9. The method as claimed in claim 1, wherein the user-specific data is entered by the user on a personal computer.

10. The method as claimed in claim 1, wherein the position of the motor vehicle is ascertained when the user leaves a driver's seat of the motor vehicle or the motor vehicle is locked.

\* \* \* \* \*